(12) United States Patent
Takenobu et al.

(10) Patent No.: US 11,099,325 B2
(45) Date of Patent: Aug. 24, 2021

(54) POLYMER OPTICAL WAVEGUIDE

(71) Applicant: AGC Inc., Chiyoda-ku (JP)

(72) Inventors: Shotaro Takenobu, Tokyo (JP);
Toshihisa Okada, Tokyo (JP); Satoko Noma, Tokyo (JP); Kenta Kobayashi, Tokyo (JP); Keisuke Hanashima, Tokyo (JP); Seiki Ohara, Tokyo (JP)

(73) Assignee: AGC Inc., Chiyoda-ku (JP)

( * ) Notice: Subject to any disclaimer, the term of this patent is extended or adjusted under 35 U.S.C. 154(b) by 0 days.

(21) Appl. No.: 16/787,158

(22) Filed: Feb. 11, 2020

(65) Prior Publication Data
US 2020/0183081 A1   Jun. 11, 2020

Related U.S. Application Data

(63) Continuation of application No. PCT/JP2018/030354, filed on Aug. 15, 2018.

(30) Foreign Application Priority Data

Aug. 16, 2017  (JP) .............................. JP2017-157129

(51) Int. Cl.
*G02B 6/122* (2006.01)
*G02B 6/125* (2006.01)
(Continued)

(52) U.S. Cl.
CPC ............... *G02B 6/245* (2013.01); *G02B 6/26* (2013.01); *G02B 6/4212* (2013.01)

(58) Field of Classification Search
CPC ........ G02B 6/245; G02B 6/26; G02B 6/4212; G02B 6/30; G02B 6/3885; G02B 6/1221; G02B 6/125; G02B 2006/12061
See application file for complete search history.

(56) References Cited

U.S. PATENT DOCUMENTS 5,392,368 A * 2/1995 Schiltz ..................... G02B 6/30
                                                          385/14
5,999,670 A * 12/1999 Yoshimura ........... G02B 6/1221
                                                          385/31
(Continued)

FOREIGN PATENT DOCUMENTS

JP    2002-22993 A    1/2002
JP    2016-34844 A    3/2016
(Continued)

OTHER PUBLICATIONS

International Search Report dated Nov. 20, 2018 in PCT/JP2018/030354 filed Aug. 15, 2018, 2 pages.
(Continued)

*Primary Examiner* — Ryan A Lepisto
(74) *Attorney, Agent, or Firm* — Oblon, McClelland, Maier & Neustadt, L.L.P.

(57) ABSTRACT

The present invention provides a polymer optical waveguide containing: a core; and a cladding having a refractive index lower than that of the core, provided around the core, in which the polymer optical waveguide has a core-coupling section where at least a part of the cladding is not present along a light propagation direction of the polymer optical waveguide and an application type removal film A provided so as to come into contact with the core of the core-coupling section.

16 Claims, 9 Drawing Sheets

(51) Int. Cl.
*G02B 6/245* (2006.01)
*G02B 6/26* (2006.01)
*G02B 6/30* (2006.01)
*G02B 6/38* (2006.01)
*G02B 6/42* (2006.01)

(56) References Cited

U.S. PATENT DOCUMENTS

| | | | | |
|---|---|---|---|---|
| 6,226,429 | B1 * | 5/2001 | Hikita | G02B 6/138 |
| | | | | 385/49 |
| 7,029,607 | B2 * | 4/2006 | Shimizu | B29C 35/0888 |
| | | | | 264/1.25 |
| 7,330,622 | B2 * | 2/2008 | Shimizu | G02B 6/02042 |
| | | | | 385/129 |
| 7,583,880 | B2 * | 9/2009 | Anzures | G02B 6/136 |
| | | | | 385/129 |
| 7,749,410 | B2 * | 7/2010 | Shimizu | G02B 6/138 |
| | | | | 264/1.24 |
| 8,676,023 | B2 * | 3/2014 | Chuang | G02B 6/1221 |
| | | | | 385/141 |
| 8,724,937 | B2 | 5/2014 | Barwicz et al. | |
| 9,069,128 | B2 * | 6/2015 | Kuroda | G02B 6/1221 |
| 2006/0194936 | A1 | 8/2006 | Eriguchi et al. | |
| 2013/0129934 | A1 | 5/2013 | Chuang | |
| 2018/0180806 | A1 | 6/2018 | Ohara et al. | |

FOREIGN PATENT DOCUMENTS

| | | |
|---|---|---|
| JP | 2016-34845 A | 3/2016 |
| WO | WO 2005/042511 A1 | 5/2005 |
| WO | WO 2017/022717 A1 | 2/2017 |

OTHER PUBLICATIONS

Shu, J. et al., "Efficient coupler between chip-level and board-level optical waveguides," Optics Letters, vol. 36, No. 18, Sep. 15, 2011, pp. 3614-3616.

Barwicz, T. et al., "Low-Cost Interfacing of Fibers to Nanophotonic Waveguides: Design for Fabrication and Assembly Tolerances," IEEE Photonics Journal, vol. 6, No. 4, Aug. 2014, 19 pages.

\* cited by examiner

US 11,099,325 B2

POLYMER OPTICAL WAVEGUIDE

TECHNICAL FIELD

The present invention relates to a polymer optical waveguide. More specifically, it relates to a polymer optical waveguide for use in adiabatic-coupling with a silicon optical waveguide.

BACKGROUND ART

Silicon photonics interface in which a silicon optical waveguide is connected to a polymer optical waveguide with low loss and at low cost has been proposed (see Non-Patent Literatures 1 and 2 and Patent Literature 1).

FIG. 16 is a perspective view illustrating a configuration example of such a silicon photonics interface and FIG. 17 is a side view thereof.

In a silicon photonics interface 100 illustrated in FIG. 16, a silicon optical waveguide 200 is adiabatically coupled with one end side of a polymer optical waveguide 300.

The other end side of the polymer optical waveguide 300 is housed in a ferrule 400 in order to connect the polymer optical waveguide 300 to an optical fiber or the like.

A plurality of cores 310 constituting optical waveguides is provided in the polymer optical waveguide 300 illustrated in FIG. 16. In the polymer optical waveguide 300 illustrated in FIG. 17, a core-exposed section where the core 310 is exposed is provided in a coupling portion (adiabatic-coupling portion) to a silicon optical waveguide 200.

FIG. 18 is a cross-sectional view at the adiabatic-coupling portion of the silicon photonics interface 100 of FIGS. 16 and 17.

In the adiabatic-coupling portion, a core 210 of the silicon optical waveguide 200 is arranged facing the core 310 of the polymer optical waveguide 300. In the silicon optical waveguide 200, the portion other than the core 210 is a cladding 220. On the other hand, in the polymer optical waveguide 300, the portion other than the core 310 is a cladding 320.

In the adiabatic-coupling portion, in the polymer optical waveguide 300, a cladding is not provided in the portion facing the core 210 of the silicon optical waveguide 200, and the core 310 is exposed.

A positioning concave part 230 is provided on the silicon optical waveguide 200 and a positioning convex part 330 is provided on the polymer optical waveguide 300, in order to arrange the core 210 of the silicon optical waveguide 200 and the core 310 of the polymer optical waveguide 300 in an appropriate positional relationship.

On the other hand, in the polymer optical waveguide 300, a structure for positioning in the ferrule 400 is provided in the portion housed in the ferrule 400.

FIG. 19 is a view illustrating a configuration example of the ferrule 400.

The ferrule 400 illustrated in FIG. 19 is constituted of a lower member 410 and an upper member 420. A concave part 430 for housing and fixing the polymer optical waveguide 300 is provided on the lower member 410. A ridge 440 for positioning the polymer optical waveguide 300 is provided on the bottom surface of the concave part 430.

Furthermore, an opening 450 for inserting a fixing member such as a pin when connecting to another ferrule (not illustrated) is formed on the lower member 410.

FIG. 20 is a cross-sectional view of the ferrule 400 and polymer optical waveguide 300 illustrated in FIG. 19. Ridges 440a and 440b for positioning the polymer optical waveguide 300 are provided on the bottom surface of the concave part 430 of the lower member 410.

On the other hand, ridges 340 and 350 for positioning the lower member 410 are provided on the bottom surface of the polymer optical waveguide 300.

As illustrated in FIG. 20, the polymer optical waveguide 300 is positioned so as to be an appropriate positional relationship in the ferrule 400 when the ridge 440a comes into contact with the ridge 340 and the ridge 440b comes into contact with the ridge 350.

CITATION LIST

Patent Literature

Patent Literature 1: U.S. Pat. No. 8,724,937

Non-Patent Literature

Non-Patent Literature 1: Jie Shu, Ciyuan Qiu, Xuezhi Zhang, and Qianfan Xu, "Efficient coupler between chip-level and board-level optical waveguides", OPTIC S LETTERS, Vol. 36. No. 18, pp 3614-3616 (2011)

Non-Patent Literature 2: Tymon Barwics, and Yoichi Taira, "Low-Cost Interfacing of Fibers to Nanophotonic Waveguides: Design for Fabrication and Assembly Toleranes", IEEE Photonics Journal, Vol. 6, No. 4, August, 660818 (2014)

SUMMARY OF INVENTION

Technical Problem

It was clarified that in the silicon photonics interface 100 illustrated in FIG. 16, even though each constitutional element, that is, the silicon optical waveguide 200, the polymer optical waveguide 300 and the ferrule 400, is individually in a good state, poor connection may occurs in some cases when those are combined to form a silicon photonics interface. Specifically, such a poor connection may occur that positional deviation occurs in an adiabatic-coupling portion between the silicon optical waveguide 200 and the polymer optical waveguide 300, transmission loss occurs in the adiabatic-coupling portion or the like.

As a result of extensive and intensive investigations, the present inventors have found that foreign substances adhered to a polymer optical waveguide for some sort of reason cause the above-described poor connection. Specifically, foreign substances adhered to a core-exposed section 330 of the polymer optical waveguide 300 cause poor connection such as occurrence of positional deviation in the adiabatic-coupling portion with the silicon optical waveguide 200 or occurrence of transmission loss.

To solve the above problems, an object of the present invention is to provide a polymer optical waveguide that can eliminate poor connection with other elements.

Solution to Problem

To achieve the above object, the present invention provides a polymer optical waveguide containing: a core; and a cladding having a refractive index lower than that of the core, provided around the core, in which the polymer optical waveguide has a core-coupling section where at least a part of the cladding is not present along a light propagation direction of the polymer optical waveguide and an application type removal film A provided so as to come into contact with the core of the core-coupling section.

It is preferable that the polymer optical waveguide of the present invention has a ferrule-coupling section and has an application type removal film B in the ferrule-coupling section.

In the polymer optical waveguide of the present invention, the removal film A and/or the removal film B preferably have a thickness of from 1 μm to 500 μm.

In the polymer optical waveguide of the present invention, the removal film A and/or the removal film B preferably have a visible light transmittance of 30% or more in a wavelength of from 380 nm to 780 nm at a thickness of 100 μm.

In the polymer optical waveguide of the present invention, a peeling force between the removal film A and/or the removal film B and the polymer optical waveguide is preferably from 0.1 N/25 mm to 2.5 N/25 mm.

In the polymer optical waveguide of the present invention, the removal film A and/or the removal film B preferably have a peel tab.

In the polymer optical waveguide of the present invention, the peel tab preferably has a hardness of higher than a hardness of the removal film A and/or the removal film B.

The polymer optical waveguide of the present invention preferably has a protective member between the peel tab and the polymer optical waveguide.

In the polymer optical waveguide of the present invention, a peeling force between the protective member and the polymer optical waveguide is preferably lower than the peeling force between the removal film A and/or the removal film B and the polymer optical waveguide.

In the polymer optical waveguide of the present invention, the protective member is preferably formed of a material in which adhesive strength to the polymer optical waveguide is decreased by UV irradiation.

It is preferable that the polymer optical waveguide of the present invention has a removal film C that includes the removal film A and the removal film B, and the removal film C has a cleaved groove between the removal film A and the removal film B.

It is preferable that the polymer optical waveguide of the present invention has a portion at which the protective member and the peel tab are arranged in this order between the polymer optical waveguide and the removal film C, and the cleaved groove penetrates through the removal film C and the peel tab and reaches the protective member.

In the polymer optical waveguide of the present invention, the cleaved groove in the protective member preferably has a depth of from 10% to 50% of a thickness of the protective member.

In the polymer optical waveguide of the present invention, the removal film A and/or the removal film B are preferably formed of a resin composition free of a silicone compound.

In the polymer optical waveguide of the present invention, the removal film A and/or the removal film B are preferably formed of a resin composition containing a compound undergoing ring-opening polymerization and/or its polymer.

In the polymer optical waveguide of the present invention, the removal film A and/or the removal film B are preferably formed of a resin composition containing a cyclic acetal and/or its polymer.

In the polymer optical waveguide of the present invention, the removal film A and/or the removal film B are preferably formed of a resin composition containing 1,3-dioxolane and/or its polymer.

Advantageous Effects of Invention

According to the polymer optical waveguide of the present invention, foreign substances can be prevented from being adhered to a connection portion with other elements. As a result, poor connection with other elements due to adhesion of foreign substances can be prevented.

DESCRIPTION OF EMBODIMENTS

The present invention is described below by reference to the drawings.

Figure 1:
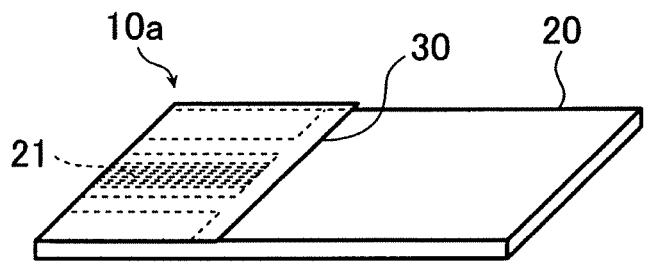
FIG. 1 is a perspective view illustrating a configuration example of a polymer optical waveguide of the present invention.
Figure 2:
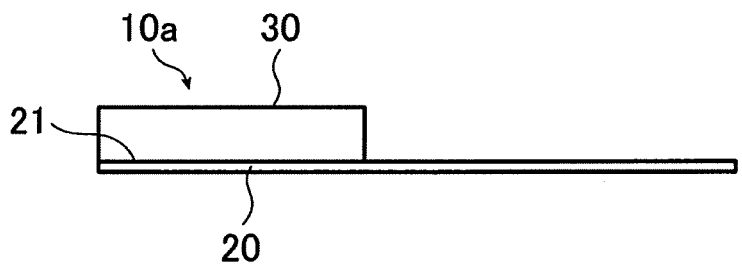
FIG. 2 is a side view of the polymer optical waveguide of FIG. 1.

FIG. 1 is a perspective view illustrating a configuration example of a polymer optical waveguide of the present invention, and FIG. 2 is a side view thereof.

A polymer optical waveguide 10a illustrated in FIGS. 1 and 2 has a polymer optical waveguide body 20. The polymer optical waveguide body 20 contains: a core (not illustrated); and a cladding (not illustrated) having a refractive index lower than that of the core, provided around the core. The polymer optical waveguide body 20 has a coupling section 21 of the core (hereinafter referred to as a core-coupling section) at its one end side. In the core-coupling section 21, at least a part of the cladding is not present along a light propagation direction of the polymer optical waveguide body 20. The core-coupling section 21 is used for adiabatic-coupling between the core of the polymer optical waveguide body 20 and a core of a silicon optical waveguide. The core-coupling section 21 in the polymer optical waveguide body 20 has a removal film A 30. In other words, the polymer optical waveguide 10a illustrated in FIGS. 1 and 2 contains the removal film A 30 provided so as to come into contact with the core in the core-coupling section 21, of the polymer optical waveguide body 20.

The polymer optical waveguide 10a illustrated in FIGS. 1 and 2 has the removal film A 30 and, as a result, can prevent foreign substances from being adhered to the core-coupling section 21. In the case where the removal film A 30 is formed from a resin composition described hereinafter, such the removal film A 30 has a high adhesion to the core-coupling section 21 and thus, even in case where foreign substances strongly adhered to the core-coupling section 21 are present, the foreign substances strongly adhered to the core-coupling section 21 can be removed by peeling the removal film A 30.

Figure 3:
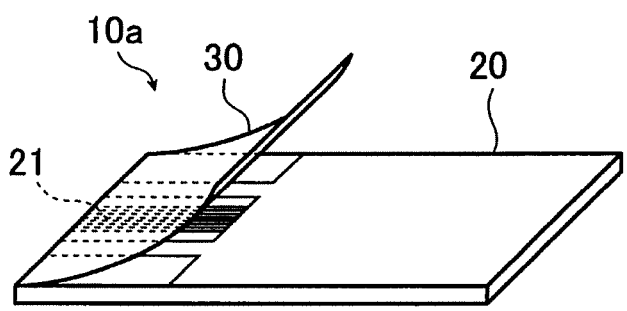
FIG. 3 is a perspective view illustrating a use embodiment of the polymer optical waveguide of FIG. 1.
Figure 4:
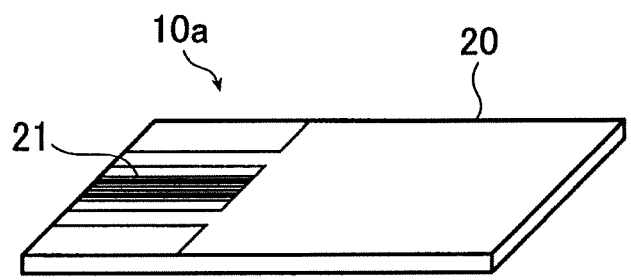
FIG. 4 is a perspective view illustrating a use embodiment of the polymer optical waveguide of FIG. 1.

FIGS. 3 and 4 are perspective views illustrating use embodiments of the polymer optical waveguide 10a of FIG. 1. As shown in FIGS. 3 and 4, the removal film A 30 is peeled from the core-coupling section 21 when using the polymer optical waveguide 10a of FIG. 1. Examples of the method for peeling the removal film A 30 from the polymer optical waveguide body 20 include a method of holding an edge of the removal film A 30 by tweezers or the like and pulling the removal film, thereby peeling the removal film A 30 from the polymer optical waveguide body 20, a method of adhering an adhesive tape to a surface of the removal film A 30 and pulling the adhesive tape, thereby peeling the removal film A 30 from the polymer optical waveguide body 20, and the like.

In the case where the removal film A 30 is peeled in a pre-step of adiabatically coupling the core of the core-coupling section 21 with a core of a silicon optical waveguide, the core of the core-coupling section 21 can be adiabatically coupled with the core of the silicon optical waveguide in a state that foreign substances have been removed. This solves poor connection in the adiabatic-coupling portion, such as positional deviation and transmission loss due to the presence of foreign substances adhered to the core-coupling section 21.

In general, when connected to optical fibers or the like, the edge of the polymer optical waveguide to be connected to the optical fibers is polished, and polishing chips generated during the polishing can be prevented from being adhered to the core-coupling section 21.

The thickness of the removal film A 30 is not particularly limited, and is preferably from 1 µm to 500 µm. In the case where the thickness of the removal film A 30 is less than 1 µm, in the case where the removal film A 30 is a film obtained by curing a resin composition, there is a possibility that foreign substances adhered to the surface of the core-coupling section 21 cannot be sufficiently removed. Furthermore, there is a possibility that pinholes are generated on the removal film A 30, and foreign substances cannot be prevented from being adhered to the core-coupling section 21. Additionally, there is a possibility that the removal film A 30 is partially peeled when cutting the polymer optical waveguide 10a or when polishing the edge. In the case where the thickness of the polished removal film A 30 is less than 1 µm, there is a possibility that the removal film A 30 is broken during peeling, which causes scratches and foreign substances. Furthermore, workability is poor when peeling the removal film A 30. The thickness of the removal film A 30 is more preferably 5 m or more, still more preferably 10 µm or more, yet still more preferably 15 µm or more, and particularly preferably 20 µm or more.

On the other hand, in the case where the thickness of the removal film A 30 is more than 500 µm, the removal film A 30 may be peeled during a dicing step when dividing the polymer optical waveguide 10a into individual pieces. Additionally, the polymer optical waveguide 10a may be deformed. The thickness of the removal film A 30 is more preferably 400 µm or less, still more preferably 300 µm or less, yet still more preferably 250 µm or less, yet still further preferably 200 µm or less, and particularly preferably 150 µm or less.

The removal film A 30 preferably has a visible light transmittance of 30% or more in a wavelength of from 380 nm to 780 nm at a thickness of 100 µm. In the case where the transmittance is less than 30%, the core present in the core-coupling section 21 is difficult to be seen over the removal film A 30, which may lead to difficulty in processing work such as dicing or edge-polishing when dividing the polymer optical waveguide 10a into individual pieces, and in mounting works such as alignment when adiabatically coupling the core of the core-coupling section 21 with a core of a silicon optical waveguide.

The removal film A 30 preferably has a peeling force to the polymer optical waveguide 20 being from 0.1 N/25 mm to 2.5 N/25 mm. In the case where the peeling force is less than 0.1 N/25 mm, there is a possibility that the removal film A 30 peels during dicing when dividing the polymer optical waveguide into individual pieces, and foreign substances such as dicing chips enter between the removal film A 30 and the polymer optical waveguide body 20 and are adhered to the coupling section 21.

On the other hand, in the case where the peeling force is more than 2.5 N/25 mm, the polymer optical waveguide body 20 may be broken when peeling the removal film A 30. The peeling force is more preferably from 0.1 N/25 mm to 2.3 N/25 mm, still more preferably from 0.1 N/25 mm to 2.0 N/25 mm, yet still more preferably from 0.2 N/25 mm to 1.5 N/25 mm, and particularly preferably from 0.4 N/25 mm to 1.5 N/25 mm.

The removal film A 30 is an application type removal film. In the present description, the application type removal film means that obtained by applying a resin composition to the surface of the polymer optical waveguide body 20, followed by drying and curing, thereby forming a film. According to the application type removal film, the removal film A 30 can be formed in a state that the resin composition has followed concavo-convex surface shapes of the polymer optical waveguide body 20. The application type removal film can follow the concavo-convex surface shapes of the polymer optical waveguide body 20 and be closely adhered thereto. Therefore, foreign substances can be prevented from being adhered to the surface of the polymer optical waveguide body 20 for the reason, for example, that a space in which foreign substances enter is not formed between the polymer optical waveguide body 20 and the removal film A 30 and the like. The removal film A 30 has high adhesion to the polymer optical waveguide body 20. Therefore, even in the case where foreign substances are strongly adhered to the core-coupling section 21 are present, the foreign substances strongly adhered to the core-coupling section 21 can be removed by peeling off the removal film A 30.

The resin composition to be used for the application type removal film preferably does not contain a silicone compound. In the case where a resin composition containing a silicone compound is used for the removal film A 30, the silicone compound remains on the core-coupling section 21, which may lead to occurrence of poor connection, such as an increase in propagation loss in the adiabatic-coupling portion.

The resin composition preferably contains a compound having small volume shrinkage at curing. In the case where the volume shrinkage at curing is large, warpage may occur in the polymer optical waveguide body 20 when forming the removal film A 30, or wrinkles may be generated in the removal film A 30. The resin composition containing a compound having small volume shrinkage at curing may not involve such a problem. Specific examples of the compound having small volume shrinkage at curing include a compound undergoing ring-opening polymerization and/or its polymer. Examples of the compound undergoing ring-opening polymerization includes a cyclic acetal. Therefore, the resin composition preferably contains a cyclic acetal and/or its polymer.

Above all, in the case where the resin composition contains 1,3-dioxolane and/or its polymer, the resin composition can be applied and then cured at ordinary temperatures, to thereby form the removal film A 30. Such a resin composition has very small volume shrinkage at curing and additionally, the removal film A 30 formed has stretchability. Therefore, even though some stress is generated by curing shrinkage, the stress can be relaxed by viscoelasticity of the removal film A 30. The resin composition containing 1,3-dioxolane and/or its polymer may be a commercially available product.

Figure 5:
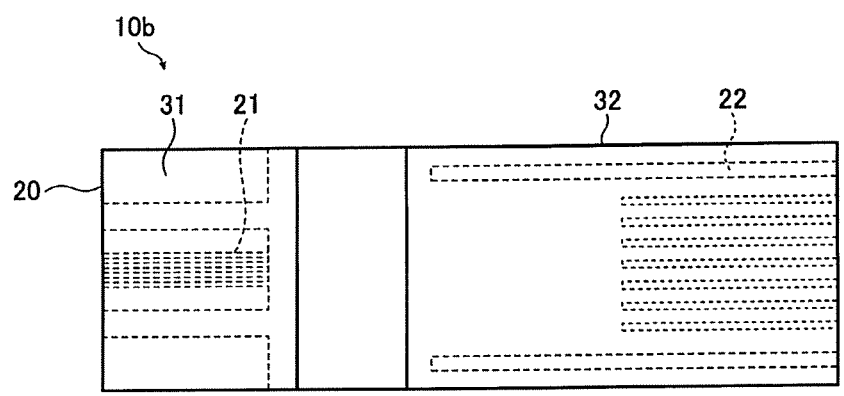
FIG. 5 is a plane view illustrating another configuration example of the polymer optical waveguide of the present invention.
Figure 6:
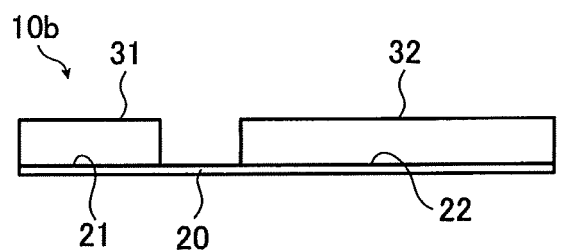
FIG. 6 is a side view of the polymer optical waveguide of FIG. 5.

FIG. 5 is a plane view illustrating another configuration example of the polymer optical waveguide of the present invention, and FIG. 6 is its side view. A polymer optical waveguide 10b illustrated in FIGS. 5 and 6 is the same as the polymer optical waveguide 10a illustrated in FIGS. 1 and 2 in the points of containing the polymer optical waveguide body 20, having the core-coupling section 21 in one end side thereof, and having a removal film A 31 provided so as to come into contact with the core of the core-coupling section 21 of the polymer optical waveguide body 20, and in the effects by those points.

Figure 20:
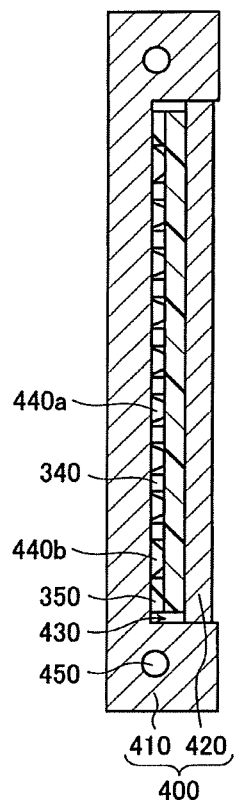
FIG. 20 is a cross-sectional view illustrating a connection portion between the polymer optical waveguide 300 and the ferrule 400 in the silicon photonics interface illustrated in FIGS. 16 and 17.

The polymer optical waveguide 10b illustrated in FIGS. 5 and 6 has a ferrule-coupling section 22 at the other end side of the polymer optical waveguide body 20. A structure for positioning in a ferrule, like ridges 340 and 350 in a polymer optical waveguide 300 illustrated in FIG. 20, is provided in the ferrule-coupling section 22. The polymer optical waveguide 10b illustrated in FIGS. 5 and 6 contains a removal film B 32 in the ferrule-coupling section 22.

Figure 16:
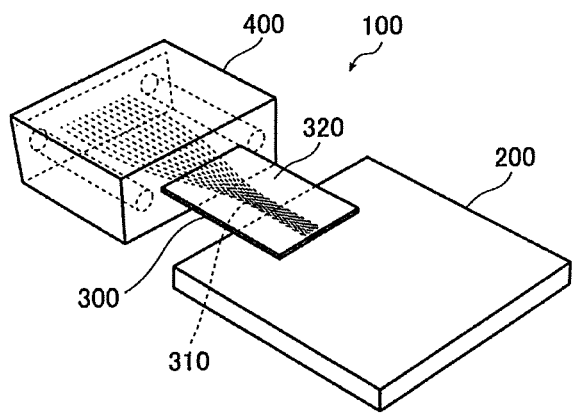
FIG. 16 is a perspective view illustrating a configuration example of a silicon photonics interface.
Figure 17:
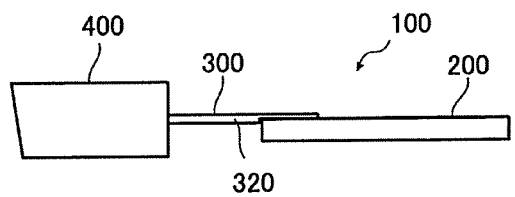
FIG. 17 is a side view of the silicon photonics interface of FIG. 16.
Figure 18:
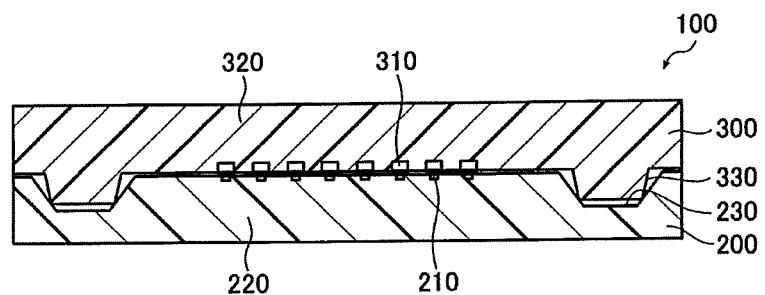
FIG. 18 is a cross-sectional view illustrating an adiabatic-coupling portion between a silicon optical waveguide 200 and a polymer optical guide 300 in the silicon photonics interface illustrated in FIGS. 16 and 17.
Figure 19:
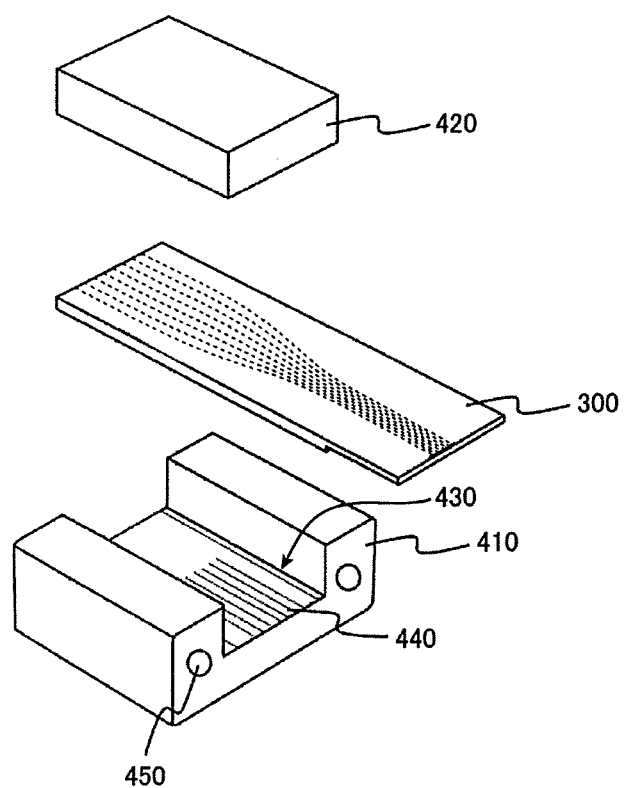
FIG. 19 is a perspective view illustrating a configuration example of a ferrule 400 in the silicon photonics interface illustrated in FIGS. 16 and 17.

When foreign substances are adhered to a coupling portion between a polymer optical waveguide 300 and a ferrule 400 in a silicon photonics interface illustrated in FIG. 16 for some reason, poor connection such as occurrence of positional deviation to a structure (ridge 440) for positioning provided in the ferrule 400 occurs.

Foreign substances can be prevented from being adhered to the ferrule-coupling section 22 in the case where the polymer optical waveguide 10b illustrated in FIGS. 5 and 6 has the removal film B 32. The formation of the removal film B 32 by applying the resin composition described above to the polymer optical waveguide body 20, followed by curing is preferred since surface followability to the ferrule-coupling section 22 having minute irregularities is satisfactory. The application type removal film B 32 thus formed has high adhesion to the ferrule-coupling section 22. Therefore, even in the case where foreign substances strongly adhered to the ferrule-coupling section 22 are present, the foreign substances strongly adhered to the ferrule-coupling section 22 can be removed by peeling off the removal film B 32.

In the case where the removal film B 32 is peeled from the ferrule-coupling section 22 when using the polymer optical waveguide 10b illustrated in FIGS. 5 and 6, the polymer optical waveguide 10b can be coupled with a ferrule in a state that foreign substances are not present on the ferrule-coupling section 22. Examples of the method for peeling the removal film B 32 from the polymer optical waveguide body 20 include a method of holding an edge of the removal film B 32 by tweezers or the like and pulling the removal film, thereby peeling the removal film B 32 from the polymer optical waveguide body 20, a method of adhering an adhesive tape to a surface of the removal film B 32 and pulling the adhesive tape, thereby peeling the removal film B 32 from the polymer optical waveguide body 20, and the like.

Accordingly, positional deviation in a ferrule, for example, that the polymer optical waveguide is obliquely fixed in a ferrule can be prevented. As a result, when connecting the polymer optical waveguide to optical fibers or the like through a ferrule, deviation in alignment of edges to each other can be suppressed.

The thickness, transmittance, peeling force, and constituent material of the removal film B 32 are the same as described for the removal film A 30 above. Formation of the removal film A 31 and removal film B 32 by using the same material in the polymer optical waveguide 10b illustrated in FIGS. 5 and 6 is preferred since the removal film A 31 and removal film B 32 can be simultaneously formed and workability is improved.

Figure 7:
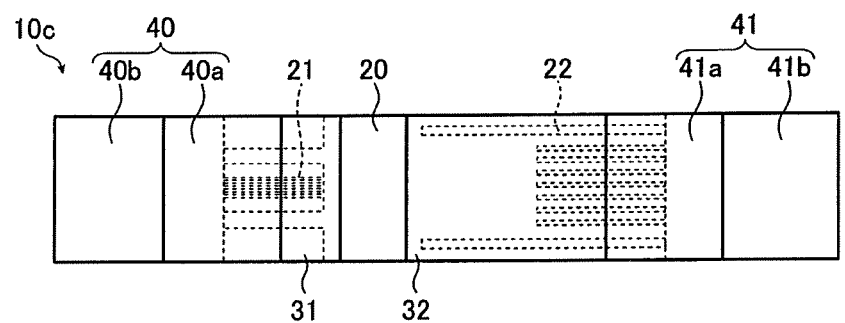
FIG. 7 is a plane view illustrating still another configuration example of the polymer optical waveguide of the present invention.
Figure 8:
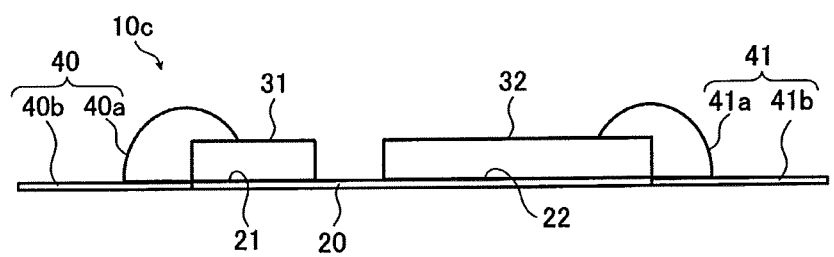
FIG. 8 is a side view of the polymer optical waveguide of FIG. 7.

FIG. 7 is a plane view illustrating still another configuration example of the polymer optical waveguide of the present invention, and FIG. 8 is its side view. A polymer optical waveguide 10c illustrated in FIGS. 7 and 8 is the same as the polymer optical waveguide 10b illustrated in FIGS. 5 and 6 in the points of containing the polymer optical waveguide body 20, having the core-coupling section 21 in one end side thereof, having a removal film A 31 provided so as to come into contact with the core of the core-coupling section 21 of the polymer optical waveguide body 20, having the ferrule-coupling section 22 at the other end side, and having the removal film B 32 on the ferrule-coupling section 22, and in the effects by those points.

In the polymer optical waveguide 10c illustrated in FIGS. 7 and 8, the removal film A 31 and removal film B 32 have peel tabs 40 and 41. The peel tab 40 is constituted of a peel tab (body) 40*a* and a peel tab (seat part) 40*b*. The peel tab 41 is constituted of a peel tab (body) 41*a* and a peel tab (seat part) 41*b*. Those peel tabs 40 and 41 have the peel tabs (seat parts) 40*b* and 41*b* at an edge of the polymer optical waveguide body 20, and the peel tabs (bodies) 40*a* and 41*a* are formed by potting a resin composition.

In the polymer optical waveguide 10*c* illustrated in FIGS. 7 and 8, the peel tabs (bodies) 40*a* and 41*a* serve an origin of peeling of the removal film A 31 and removal film B 32. When the removal film A 31 and removal film B 32 are peeled while holding the peel tabs (bodies) 40*a* and 41*a*, the removal film A 31 and removal film B 32 can be easily peeled without damaging the polymer optical waveguide body 20.

For this reason, hardness of the peel tabs (bodies) 40*a* and 41*a* is preferably higher than hardness of the removal film A 31 and removal film B 32.

Bending strength of the removal film A 31 and removal film B 32 preferably differs from bending strength of the polymer optical waveguide body 20 from the standpoint of peelability of the removal film A 31 and removal film B 32. Specifically, any one of the following relationships is preferably satisfied:

Bending strength of removal film A 31 and removal film B 32> bending strength of polymer optical waveguide body 20; and Bending strength of removal film A 31 and removal film B 32<bending strength of polymer optical waveguide body 20.

In the former case, the removal film A 31 and removal film B 32 can be peeled by bending the polymer optical waveguide body 20, and therefore can be easily peeled without the peel tabs 40 and 41.

Figure 9:
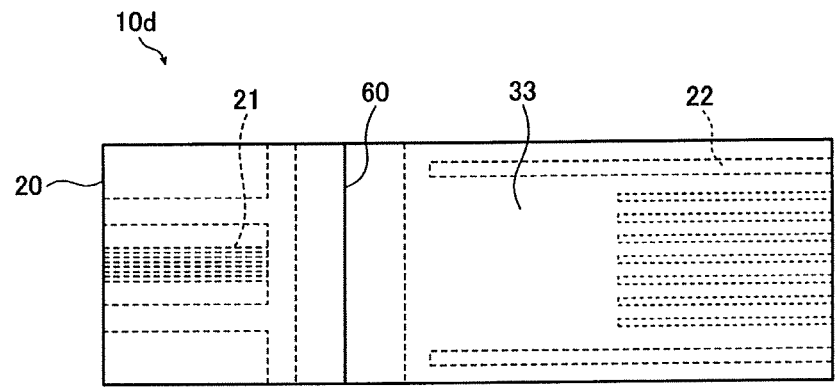
FIG. 9 is a plane view illustrating still another configuration example of the polymer optical waveguide of the present invention.
Figure 10:
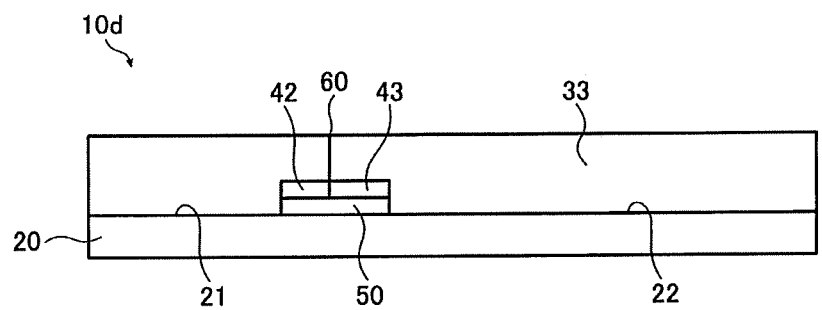
FIG. 10 is a side view of the polymer optical waveguide of FIG. 9.

FIG. 9 is a plane view illustrating still another configuration example of the polymer optical waveguide of the present invention, and FIG. 10 is its side view. The polymer optical waveguide 10*d* illustrated in FIGS. 9 and 10 is the same as the polymer optical waveguide 10*b* illustrated in FIGS. 5 and 6 in the points of containing the polymer optical waveguide body 20, having the core-coupling section 21 at one end side thereof and having the ferrule-coupling section 22 at the other end side. The polymer optical waveguide 10*d* illustrated in FIGS. 9 and 10 contains a removal film C 33 on the entire upper surface of the polymer optical waveguide body 20 including the core-coupling section 21 and the ferrule-coupling section 22. The removal film C 33 includes the removal film A of the core-coupling section 21 and the removal film B of the ferrule-coupling section 22, and has a cleaved grove 60 in order to independently peel those films. The removal film C 33 preferably has peel tabs 42 and 43 below the cleaved groove 60 and preferably has a protective member (protective film) 50 further below the peel tabs 42 and 43. In other words, the portion having the cleaved groove 60 preferably has the protective member 50, the peel tabs 42 and 43 and the removal film C 33 in this order on the polymer optical waveguide body 20. The cleaved groove 60 is preferably formed by a method such as dicing after forming the peel tabs 42 and 43 and the removal film C 33 on the polymer optical waveguide body 20. The protective member 50 formed between the peel tabs 42 and 43 and the polymer optical waveguide body 20 can prevent the polymer optical waveguide body 20 from being damaged when dicing.

Figure 11:
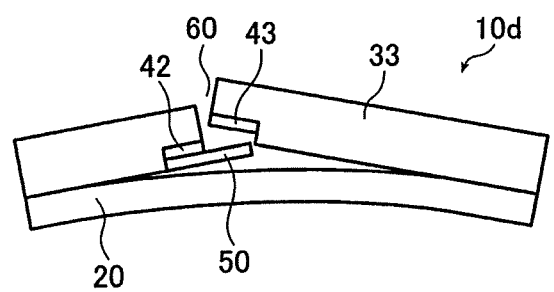
FIG. 11 is a side view illustrating a use embodiment of the polymer optical waveguide of FIG. 10.
Figure 12:
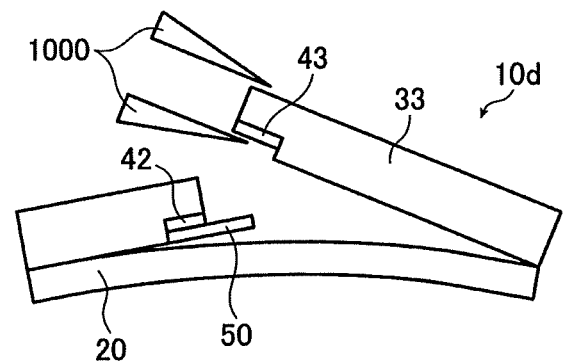
FIG. 12 is a side view illustrating a use embodiment of the polymer optical waveguide of FIG. 10.

Furthermore, the protective member 50 formed between the peel tabs 42 and 43 and the polymer optical waveguide body 20 can also prevent the polymer optical waveguide body 20 from being damaged when peeling the removal film C 33. FIGS. 11 and 12 are side views illustrating a use embodiment of the polymer optical waveguide 10*d* of FIG. 10. Specifically, FIGS. 11 and 12 are views illustrating procedures of peeling the removal film C 33 from the polymer optical waveguide 10*d* illustrated in FIG. 10. As illustrated in FIG. 11, the entire polymer optical waveguide 10*d* including the polymer optical waveguide body 20 and the removal film C 33 is bent to separate the removal film C 33 right and left by the cleaved groove 60. Next, as illustrated in FIG. 12, the peel tab 43 is pinched by a pinching means 1000 and the removal film C 33 is peeled. During the procedures, the protective member 50 can also prevent the polymer optical waveguide body 20 from being damaged by the contact of the pinching means 1000.

To exhibit the above function, the adhesive force between the peel tabs 42 and 43 and the removal film C 33 is preferably higher than the adhesive force between the peel tabs 42 and 43 and the protective member 50.

FIGS. 11 and 12 illustrate the procedures of peeling the removal film C 33 at the right side of the drawings from the polymer optical waveguide body 20. However, the protective member 50 is required to be peeled from the polymer optical waveguide body 20 together with the removal film C 33 in the stage of peeling the removal film C 33 at the left side of the drawings from the polymer optical waveguide body 20. For this reason, the peeling force between the protective member 50 and the polymer optical waveguide body 20 is preferably lower than the peeling force between the removal film C 33 and the polymer optical waveguide body 20.

However, as illustrated in FIGS. 11 and 12, the peeling force between the protective member 50 and the polymer optical waveguide body 20 is not always required to be lower than the peeling force between the removal film C 33 and the polymer optical waveguide body 20 in the stage of peeling the removal film C 33 at the right side of the drawings from the polymer optical waveguide body 20.

Formation of the protective member 50 from a material in which adhesive strength to the polymer optical waveguide body 20 is decreased by UV irradiation is preferable since the adhesive strength to the polymer optical waveguide body 20 can be decreased by UV irradiation at the stage of peeling the removal film C 33 at the left side in the drawings from the polymer optical waveguide body 20.

The constituent material of the protective member 50 is preferably a photocurable resin from the standpoint of prevention of damage to the polymer optical waveguide body 20. For the similar reason, in the case where the constituent material of the protective member 50 is a thermosetting resin, the curing temperature is preferably 100° C. or lower.

In the polymer optical waveguide 10*d* illustrated in FIG. 10, the protective member 50 and peel tabs 42 and 43 may be formed by sticking a resin tape such as a masking tape to a predetermined position on the polymer optical waveguide body 20. In this case, after sticking a resin tape constituting the protective member 50, another resin tape constituting the peel tabs 42 and 43 is stuck thereon. In this state, a resin composition is applied to the polymer optical waveguide body 20 and then cured to form the removal film C 33. Thereafter, the cleaved groove 60 is formed on a predetermined position of the removal film C 33 by a method such as dicing.

Figure 13:
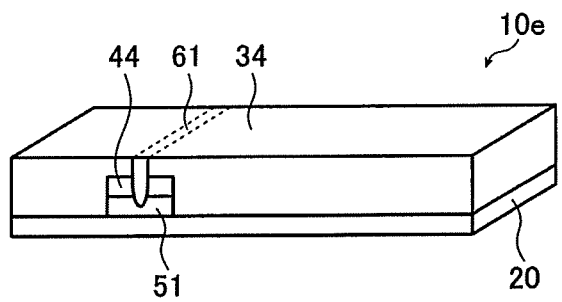
FIG. 13 is a perspective view illustrating still another configuration example of the polymer optical waveguide of the present invention.

FIG. 13 is a perspective view illustrating still another configuration example of the polymer optical waveguide of the present invention. The polymer optical waveguide 10*e* illustrated in FIG. 13 is the same as the polymer optical waveguide 10d illustrated in FIG. 10 in the point of having a removal film C 34 formed on the entire upper surface of the polymer optical waveguide body 20, having a cleaved groove 61 formed on the removal film C 34, and having a protective member 51, a peel tab 44 and the removal film C 34 on the polymer optical waveguide body 20 in this order in the portion having the cleaved groove 61. However, the shape of the cleaved groove 61 of the polymer optical waveguide 10e illustrated in FIG. 13 differs from that of the polymer optical waveguide 10d illustrated in FIG. 10 and is a U-shape. Furthermore, in the polymer optical waveguide 10e illustrated in FIG. 13, the cleaved groove 61 penetrates through the removal film C 34 and the peel tab 44 and reaches the protective member 51. In the case where the cleaved groove 61 is formed by a method such as dicing according to the above procedures, the cleaved groove 61 reaching the protective member 51 as in the illustrated embodiment is preferable since the generation of foreign substances when peeling the removal film C 34 can be suppressed. However, in the case where the cleaved groove 61 penetrates through the protective member 51, the polymer optical waveguide body 20 is damaged when dicing, which is not preferred. For this reason, the depth of the cleaved groove 61 in the protective member 51 is preferably from 10% to 50% of the thickness of the protective member 51.

Figure 14:
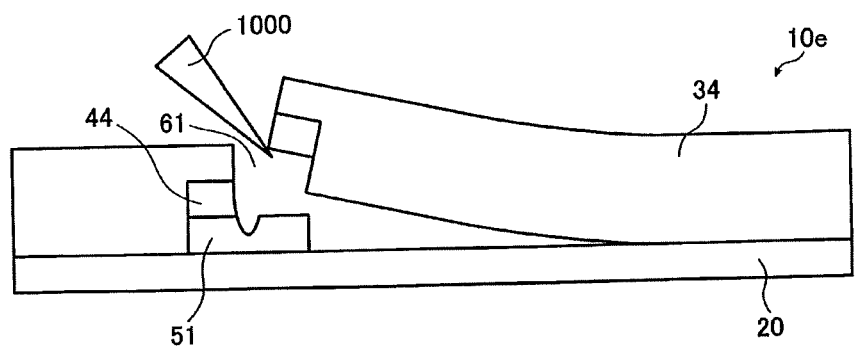
FIG. 14 is a side view illustrating a use embodiment of the polymer optical waveguide of FIG. 13.
Figure 15:
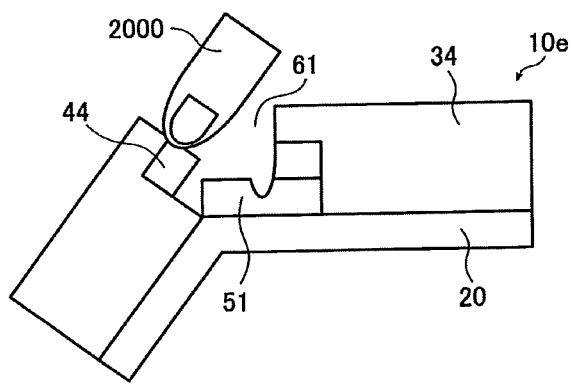
FIG. 15 is a side view illustrating a use embodiment of the polymer optical waveguide of FIG. 13.

FIGS. 14 and 15 are side views illustrating use embodiments of the polymer optical waveguide 10e of FIG. 13. Specifically, those are the drawings illustrating the procedures of peeling the removal film C 34 from the polymer optical waveguide 10e illustrated in FIG. 13. In FIG. 14, the peel tab 44 is pinched by the pinching means 1000 and the removal film C 34 at the center of the drawing is peeled. The polymer optical waveguide body 20 is prevented from being damaged by the pinching means 100 since the protective member 51 is present below the peel tab 44.

In the case where the polymer optical waveguide body 20 has a bendability, the removal film C 34 may be peeled by bending the entire polymer optical waveguide 10e while pinching the peel tab 44 with a finger 2000 as illustrated in FIG. 15.

The polymer optical waveguide of the present invention is further described below.

In the polymer optical waveguide of the present invention, constituent materials of the core and cladding in the polymer optical waveguide body is not particularly limited so long as they are materials providing a difference in refractive index such that the refractive index of the cladding is lower than the refractive index of the core. Examples of the material that can be used include various resin materials, for example, an acrylic resin, a methacrylic resin such as polymethyl methacrylate (PMMA), an epoxy resin, an oxetane resin, a phenoxy resin, a benzocyclobutene resin, a norbornene resin, a fluorine resin, a silicone resin, a phenol resin, a polyester resin, a polycarbonate resin, a polystyrene resin, a polyamide resin, a polyimide resin such as a polyimide resin, a poly(imide-isoindoloquinazolinedione imide) resin, a polyether imide resin, a polyether ketone resin, and a polyester imide resin, a polybenzoxazole resin, a polysilane, and a polysilazaneimidazole resin, and organic and inorganic hybrid materials.

Of those materials, a fluorine resin has low water absorption and moisture absorption, excellent resistance to high temperature and high humidity and high chemical stability, and is therefore suitable as a material of a core and a cladding. The polymer optical waveguide using the fluorine resin shows small fluctuation in a refractive index due to the change in the external environment, particularly the change in humidity, is stable in properties, and shows high transparency in an optical communication wavelength band.

A method for producing the polymer optical waveguide body of the present invention is not particularly limited, and various method can be used. Specifically, a duplication (stamper) method, a direct exposure method, a method of combining a reactive ion-etching (RIE) method with a photolithography process, a method based on injection-molding, a photobleaching method, a direct-drawing method, a self-formation method, and the like can be used.

An example of a method for producing the polymer optical waveguide body of the present invention is described below.

A coating liquid containing a precursor of a constituent material of cladding is applied to a substrate by a spin-coating method. Subsequently, the precursor of the constituent material of cladding is cured to form a cladding lower than a core (hereinafter referred to as an "under-cladding" in the present description).

Next, a coating liquid containing a precursor of a constituent material of core is applied on the under-cladding by a spin-coating method. Subsequently, the precursor prepolymer of the constituent material of core is subjected to patterning by a photolithography process to form a core on the under-cladding. After forming the core, post-baking may be performed as necessary.

Next, a coating liquid containing a precursor of the constituent material of cladding is applied on the under-cladding and the core by a spin-coating method. Subsequently, the precursor of the constituent material of cladding is cured to form a cladding upper than the core (hereinafter referred to as an "over-cladding" in the present description). Thus, a polymer optical waveguide body is formed. When forming the over-cladding, a core-coupling section on which at least a part of the over-cladding is not present can be formed along a light propagation direction of the polymer optical waveguide body by a photolithography process. The core-coupling section is used in an adiabatic-coupling between the core of the polymer optical waveguide body and a core of a silicon optical waveguide.

EXAMPLES

The present invention is described in further detail below by reference to the following Examples but the present invention should not be construed as being limited to these Examples. Examples 1 to 8 are Invention Examples and Examples 9 to 11 are Comparative Examples. Examples 1 to 8 are embodiments directed to an application type removal film and Examples 10 to 11 are embodiments directed to a film type removal film.

Example 1

In this Example, the polymer optical waveguide 10b illustrated in FIGS. 5 and 6 was prepared. Specifically, a solution containing a compound (1,3-dioxolane) undergoing ring-opening polymerization was applied to the core-coupling section 21 and ferrule-coupling section 22 on the polymer optical waveguide body 20 by a dispenser and then cured at ordinary temperatures, thereby forming the removal film A 31 and the removal film B 32, to thereby prepare the polymer optical waveguide 10b.

The thickness of the removal film A 31 and removal film B 32 was measured by the following procedures.

The thickness of the removal film peeled from the polymer optical waveguide was measured by using a micrometer (Model: MDC-MX, manufacturer: Mitutoyo Corporation). The thickness was measured at 3 places of the removal film, its average value was obtained, and the average value was used as the thickness of the removal film. The thickness of the removal film was 200 μm.

Regarding the removal film A 31 and removal film B 32, the visible light transmittance in a wavelength of from 380 nm to 780 nm at a thickness of 100 μm was measured by the following procedures.

The visible light transmittance in a wavelength of from 380 nm to 780 nm was measured by using a light transmittance meter that uses LAX-C100 (manufactured by Asahi Spectra Co., Ltd.) as a light source and uses HSU-100s (Asahi Spectra Co., Ltd.) as a spectroscopic unit.

The visible light transmittance was obtained by measuring visible light transmission spectrum in a wavelength of from 380 nm to 780 nm and calculating according to JIS Standards JIS R3106 (1998).

The visible light transmittance in a wavelength of from 380 nm to 780 nm was obtained by multiplying transmittance spectrum in a wavelength of from 380 nm to 780 nm by a weight coefficient obtained from a wavelength distribution of daylight spectrum and spectral luminous efficiency, followed by weighting and averaging, as shown in the following formula.

$$\tau_V = \frac{\sum_\lambda D\lambda \times V\lambda \times \tau(\lambda)}{\sum_\lambda D\lambda \times V\lambda} \quad [\text{Math. 1}]$$

In the formula, $\tau_v$ is visible light transmittance in a wavelength of from 380 nm to 780 nm, Dλ is spectral distribution of CIE daylight D65, Vλ is CIE spectral luminous efficiency for photopic vision, τ(λ) is transmittance at wavelength λ, ΣDλ×Vλ is the sum of weight coefficient, and ΣDλ×Vλ×τ(λ) is the sum of the values obtained by multiplying the weight coefficient by the transmittance.

Figure 21:
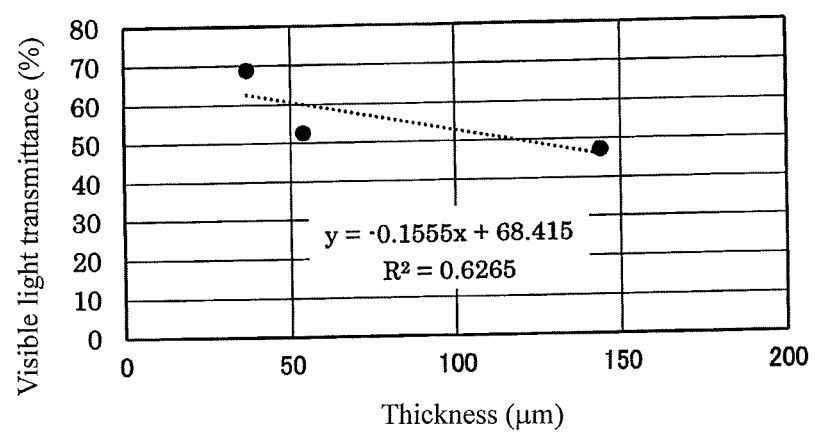
FIG. 21 is a graph showing the relationship between a thickness of a removal film and visible light transmittance in a wavelength of from 380 to 780 nm in Example 1.
Figure 22:
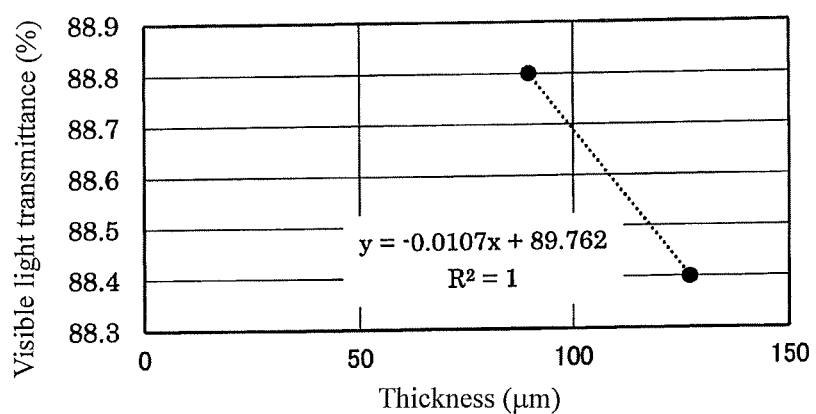
FIG. 22 is a graph showing the relationship between a thickness of a removal film and visible light transmittance in a wavelength of from 380 to 780 nm in Example 9.

The visible light transmittance in a wavelength of from 380 nm to 780 nm at a thickness of 100 μm was obtained by plotting visible light transmittance at each thickness as illustrated in FIG. 21, obtaining an approximation straight line of the thickness and visible light transmittance, and calculating the visible light transmittance at a thickness of 100 m. The visible light transmittance in a wavelength of from 380 nm to 780 nm at a thickness of 100 μm was 52.9%.

Peeling force of the removal film A 31 and removal film B 32 to the polymer optical waveguide was measured by using an autograph (Model: AG-X plus, manufacturer: Shimadzu Corporation). The measurement was performed in accordance with 900 peel test defined in JIS Z0237 (2009). The measurement conditions were that peeling rate was 2.5 mm/min and peeling force was calculated in the unit of N/25 mm. The peeling force was 1.1 N/25 mm.

Adhesion of the removal film A 31 and removal film B 32 was evaluated by the following procedures.

The polymer optical waveguide 10b having the removal film A 31 and removal film B 32 attached thereto was cut by dicing, and the adhesion of the removal film A 31 and removal film B 32 to the polymer optical waveguide 10b was evaluated.

A dicing apparatus (Model: DAD321, manufacturer: DISCO Corporation) was used in the dicing. Cutting condition was 5 mm/sec.

Evaluation criteria are as follows.

A: When a polymer optical waveguide having a removal film attached thereto was cut by dicing, the removal film does not peel from the polymer optical waveguide and positional deviation of the removal film does not occur.

B: When a polymer optical waveguide having a removal film attached thereto was cut by dicing, positional deviation of the removal film partially occurs.

C: When a polymer optical waveguide having a removal film attached thereto was cut by dicing, the removal film partially peels from the surface of the polymer optical waveguide and is removed.

Evaluation result of the adhesion of the removal film of Example 1 was A.

The polymer optical waveguide 10b was evaluated as follows.

(Amount of Foreign Substances on Core-Coupling Section 21)

The amount of foreign substances on the core-coupling section 21 was evaluated by the following procedures.

The removal film A 31 adhered to the core-coupling section 21 of the polymer optical waveguide 10b cut in the adhesion evaluation of the removal film A 31 was removed just before observation, the surface of the core-coupling section 21 was observed with an optical microscope, and the number of foreign substances adhered was evaluated.

The surface of the core of the core-coupling section 21 was observed with an objective lens of 5 magnifications by using an optical microscope (Model: STM6, manufacturer: Olympus Corporation), the number of foreign substances having a diameter of 1 μm or more adhered to the surface of the core was counted, and the number was evaluated by the following criteria.

Evaluation criteria: Number of foreign substances having a diameter of 1 μm or more adhered to the core-coupling section 21 (coupling section means only surface of core) is:

A: 10 or less

B: more than 10 and 50 or less

C: more than 50 and 100 or less

D: more than 100

The evaluation result was A.

(Amount of Foreign Substances on Ferrule-Coupling Section 22)

The amount of foreign substances on the ferrule-coupling section 22 was evaluated by the following procedures.

The removal film B 32 adhered to the ferrule-coupling section 22 of the polymer optical waveguide 10b cut in the adhesion evaluation of the removal film B 32 was removed just before observation, the surface of the ferrule-coupling section 22 was observed with an optical microscope, and the number of foreign substances adhered was evaluated.

The surface of the core of the ferrule-coupling section 22 was observed with an objective lens of 5 magnifications by using an optical microscope (Model: STM6, manufacturer: Olympus Corporation), the number of foreign substances having a diameter of 3 μm or more adhered to the surface of the core was counted, and the number was evaluated by the following criteria.

Evaluation criteria: Number of foreign substances having a diameter of 3 μm or more adhered to the ferrule-coupling section 22 is:
- A: 10 or less
- B: more than 10 and 50 or less
- C: more than 50 and 100 or less
- D: more than 100

The evaluation result was A.

Example 2

In this Example, the polymer optical waveguide 10c illustrated in FIGS. 7 and 8 was prepared. Specifically, after preparing the polymer optical waveguide 10b in the same procedures as in Example 1, peel tabs 40 and 41 were formed at the edges of the removal film A 31 and the removal film B 32 in the following procedures, to thereby prepare the polymer optical waveguide 10c.

A solution containing a compound undergoing ring-opening polymerization was dropped such that the removal film A 31 adheres to a peel tab (seat part) 40b, in a state that the removal film A 31 was brought into contact with the edge of the peel tab (seat part) 40b (or in a state that the edge of the peel tab (seat part) 40b was brought into contact with an lower part of the optical waveguide 21), and cured to form a peel tab (body) 40a, thereby forming the peel tab 40. The peel tab 41 was similarly formed.

The thickness of the removal film A 31 and removal film B 32 was measured in the same procedures as in Example 1. As a result, the thickness was 200 m.

The visible light transmittance of the removal film A 31 and removal film B 32 in a wavelength of from 380 nm to 780 nm at a thickness of 100 Lm was measured in the same procedures as in Example 1. As a result, the visible light transmittance was 52.9%.

The peeling force of the removal film A 31 and removal film B 32 was measured in the same procedures as in Example 1. As a result, the peeling force was 1.1 N/25 mm.

The adhesion of the removal film A 31 and removal film B 32 was evaluated in the same procedures as in Example 1. The evaluation result was A.

The amount of foreign substances on the core-coupling section 21 was evaluated in the same procedures as in Example 1. The evaluation result was A.

The amount of foreign substances on the ferrule-coupling section 22 was evaluated in the same procedures as in Example 1. The evaluation result was A.

Example 3

In this Example, the polymer optical waveguide 10d illustrated in FIGS. 9 and 10 was prepared. Specifically, two-ply masking tapes were attached to a predetermined position of the optical waveguide body 20 in a width of 2 mm, and a solution containing a compound undergoing ring-opening polymerization was applied to the surface including the surface of the masking tape. The solution was cured at ordinary temperatures to form a removal film C 33. Thereafter, a cleaved groove 60 was formed halfway a lower layer of the masking tapes by dicing, to thereby prepare the polymer optical waveguide 10c.

The thickness of the removal film C 33 was measured in the same procedures as in Example 1. As a result, the thickness was 200 μm.

The visible light transmittance of the removal film C 33 in a wavelength of from 380 nm to 780 nm at a thickness of 100 μm was measured in the same procedures as in Example 1. As a result, the visible light transmittance was 52.9%.

The peeling force of the removal film C 33 was measured in the same procedures as in Example 1. As a result, the peeling force was 1.1 N/25 mm.

The adhesion of the removal film C 33 was evaluated in the same procedures as in Example 1. The evaluation result was A.

The amount of foreign substances on the core-coupling section 21 was evaluated in the same procedures as in Example 1. The evaluation result was A.

The amount of foreign substances on the ferrule-coupling section 22 was evaluated in the same procedures as in Example 1. The evaluation result was A.

Example 4

In this Example, the polymer optical waveguide 10b illustrated in FIGS. 5 and 6 was prepared. Specifically, the removal film A 31 and removal film B 32 each having a thickness of 150 μm were formed in the same manners as in Example 1, except for changing the application amount when applying the solution containing a compound undergoing ring-opening polymerization by a dispenser.

The visible light transmittance of the removal film A 31 and removal film B 32 in a wavelength of from 380 nm to 780 nm at a thickness of 100 μm was measured in the same procedures as in Example 1. As a result, the visible light transmittance was 52.9%.

The peeling force of the removal film A 31 and removal film B 32 was measured in the same procedures as in Example 1. As a result, the peeling force was 1.0 N/25 mm.

The adhesion of the removal film A 31 and removal film B 32 was evaluated in the same procedures as in Example 1. The evaluation result was A.

The amount of foreign substances on the core-coupling section 21 was evaluated in the same procedures as in Example 1. The evaluation result was A.

The amount of foreign substances on the ferrule-coupling section 22 was evaluated in the same procedures as in Example 1. The evaluation result was A.

Example 5

In this Example, the polymer optical waveguide 10b illustrated in FIGS. 5 and 6 was prepared. Specifically, a solution containing a compound undergoing ring-opening polymerization was spin-coated on the core-coupling section 21 and ferrule-coupling section 22 of the polymer optical waveguide body 20 at the number of revolutions of 100 rpm for 30 seconds, and dried at 60° C. for 120 seconds to form the removal film A 31 and the removal film B 32, to thereby prepare the polymer optical waveguide 10b.

The thickness of the removal film A 31 and removal film B 32 was measured in the same procedures as in Example 1. As a result, the thickness was 100 μm.

The visible light transmittance of the removal film A 31 and removal film B 32 in a wavelength of from 380 nm to 780 nm at a thickness of 100 μm was measured in the same procedures as in Example 1. As a result, the visible light transmittance was 52.9%.

The peeling force of the removal film A 31 and removal film B 32 was measured in the same procedures as in Example 1. As a result, the peeling force was 0.9 N/25 mm.

The adhesion of the removal film A 31 and removal film B 32 was evaluated in the same procedures as in Example 1. The evaluation result was A.

The amount of foreign substances on the core-coupling section 21 was evaluated in the same procedures as in Example 1. The evaluation result was A.

The amount of foreign substances on the ferrule-coupling section 22 was evaluated in the same procedures as in Example 1. The evaluation result was A.

Example 6

In this Example, the polymer optical waveguide 10b illustrated in FIGS. 5 and 6 was prepared. Specifically, a solution containing a compound undergoing ring-opening polymerization was spin-coated on the core-coupling section 21 and ferrule-coupling section 22 of the polymer optical waveguide body 20 at the number of revolutions of 300 rpm for 30 seconds, and dried at 60° C. for 120 seconds to form the removal film A 31 and the removal film B 32, to thereby prepare the polymer optical waveguide 10b.

The thickness of the removal film A 31 and removal film B 32 was measured in the same procedures as in Example 1. As a result, the thickness was 30 µm.

The visible light transmittance of the removal film A 31 and removal film B 32 in a wavelength of from 380 nm to 780 nm at a thickness of 100 µm was measured in the same procedures as in Example 1. As a result, the visible light transmittance was 52.9%.

The peeling force of the removal film A 31 and removal film B 32 was measured in the same procedures as in Example 1. As a result, the peeling force was 0.6 N/25 mm.

The adhesion of the removal film A 31 and removal film B 32 was evaluated in the same procedures as in Example 1. The evaluation result was B.

The amount of foreign substances on the core-coupling section 21 was evaluated in the same procedures as in Example 1. The evaluation result was B.

The amount of foreign substances on the ferrule-coupling section 22 was evaluated in the same procedures as in Example 1. The evaluation result was B.

Example 7

In this Example, the polymer optical waveguide 10b illustrated in FIGS. 5 and 6 was prepared. Specifically, a solution obtained by diluting a solution containing a compound undergoing ring-opening polymerization with PGMEA in a ratio of 2:1 was spin-coated on the core-coupling section 21 and ferrule-coupling section 22 of the polymer optical waveguide body 20 at the number of revolutions of 100 rpm for 30 seconds, and dried at 60° C. for 120 seconds to form the removal film A 31 and the removal film B 32, to thereby prepare the polymer optical waveguide 10b.

The thickness of the removal film A 31 and removal film B 32 was measured in the same procedures as in Example 1. As a result, the thickness was 20 m.

The visible light transmittance of the removal film A 31 and removal film B 32 in a wavelength of from 380 nm to 780 nm at a thickness of 100 µm was measured in the same procedures as in Example 1. As a result, the visible light transmittance was 52.9%.

The peeling force of the removal film A 31 and removal film B 32 was measured in the same procedures as in Example 1. As a result, the peeling force was 0.4 N/25 mm. The adhesion of the removal film A 31 and removal film B 32 was evaluated in the same procedures as in Example 1. The evaluation result was B.

The amount of foreign substances on the core-coupling section 21 was evaluated in the same procedures as in Example 1. The evaluation result was B.

The amount of foreign substances on the ferrule-coupling section 22 was evaluated in the same procedures as in Example 1. The evaluation result was B.

Example 8

In this Example, the polymer optical waveguide 10b illustrated in FIGS. 5 and 6 was prepared. Specifically, a solution obtained by diluting a solution containing a compound undergoing ring-opening polymerization with PGMEA in a ratio of 2:1 was spin-coated on the core-coupling section 21 and ferrule-coupling section 22 of the polymer optical waveguide body 20 at the number of revolutions of 500 rpm for 30 seconds, and dried at room temperature for 15 minutes or more to form the removal film A 31 and the removal film B 32, to thereby prepare the polymer optical waveguide 10b.

The thickness of the removal film A 31 and removal film B 32 was measured in the same procedures as in Example 1. As a result, the thickness was 1 µm.

The visible light transmittance of the removal film A 31 and removal film B 32 in a wavelength of from 380 nm to 780 nm at a thickness of 100 µm was measured in the same procedures as in Example 1. As a result, the visible light transmittance was 52.9%.

The peeling force of the removal film A 31 and removal film B 32 was tried to measure in the same procedures as in Example 1. However, the film was too thin and the peeling force could not be measured.

The adhesion of the removal film A 31 and removal film B 32 was evaluated in the same procedures as in Example 1. The evaluation result was B.

The amount of foreign substances on the core-coupling section 21 was evaluated in the same procedures as in Example 1. The evaluation result was B.

The amount of foreign substances on the ferrule-coupling section 22 was evaluated in the same procedures as in Example 1. The evaluation result was B.

Example 9

In this Example, a peeling film was not formed on the polymer optical waveguide body 20, and the amount of foreign substances on the core-coupling section 21 and the amount of foreign substances on the ferrule-coupling section 22 were evaluated in the same procedures as in Example 1.

Many foreign substances derived from dicing were adhered to the core of the core-coupling section 21, and the evaluation result was D. Furthermore, many foreign substances derived from dicing were also adhered to the ferrule-coupling section 22, and the evaluation result was D.

Example 10

In this Example, the polymer optical waveguide 10b illustrated in FIGS. 5 and 6 was prepared. Specifically, a film type protective self-peeling tape having a pressure-sensitive adhesive property (product name: SELFA-MP, manufacturer: Sekisui Chemical Co., Ltd.) was stuck to each of the core-coupling section 21 and ferrule-coupling section 22 of the polymer optical waveguide body 20 as the removal film A 31 and removal film B 32, respectively.

The thickness of PET film of the removal film A 31 and removal film B 32 was 55 µm.

The peeling force of the removal film A 31 and removal film B 32 was measured in the same procedures as in Example 1. As a result, the peeling force was 1.8 N/25 mm.

The adhesion of the removal film A 31 and removal film B 32 was evaluated in the same procedures as in Example 1. The evaluation result was C.

The amount of foreign substances on the core-coupling section 21 was evaluated in the same procedures as in Example 1. The evaluation result was D.

The amount of foreign substances on the ferrule-coupling section 22 was evaluated in the same procedures as in Example 1. The evaluation result was D.

The film type removal film of Example 10 has a high peeling force, but has a high hardness and is difficult to bend. Therefore, the removal film could not follow and adhere to the surface concavo-convex shape of the polymer optical waveguide and peeled in the evaluation of adhesion, and the amount of foreign substances on the surface of the polymer optical waveguide was large.

Example 11

In this Example, the polymer optical waveguide 10b illustrated in FIGS. 5 and 6 was prepared. Specifically, a film type cleaning tape having a pressure-sensitive adhesive property (product name: EC-7507, manufacturer: SUMIRON) was stuck to each of the core-coupling section 21 and ferrule-coupling section 22 of the polymer optical waveguide body 20 as the removal film A 31 and removal film B 32, respectively.

The thickness of the removal film A 31 and removal film B 32 was 45 μm.

The peeling force of the removal film A 31 and removal film B 32 was measured in the same procedures as in Example 1. As a result, the peeling force was 0.9 N/25 mm.

The adhesion of the removal film A 31 and removal film B 32 was evaluated in the same procedures as in Example 1. The evaluation result was C.

The amount of foreign substances on the core-coupling section 21 was evaluated in the same procedures as in Example 1. The evaluation result was D.

The amount of foreign substances on the ferrule-coupling section 22 was evaluated in the same procedures as in Example 1. The evaluation result was D.

The film type removal film of Example 11 has a low hardness as compared with the removal film of Example 10 and is easy to bend as compared with the removal film of Example 10. However, even the removal film of Example 11 could not follow and adhere to the surface concavo-convex shape of the polymer optical waveguide and peeled in the evaluation of adhesion, and the amount of foreign substances on the surface of the polymer optical waveguide was large.

Example 12

In this Example, the polymer optical waveguide 10b illustrated in FIGS. 5 and 6 was prepared. Specifically, a UV-curable type temporary fixing adhesive containing an acrylic ester (product name: TEMPLOC YG-100, manufacturer: DENKA) was spin-coated on the core-coupling section 21 and ferrule-coupling section 22 of the polymer optical waveguide body 20 at the number of revolutions of 1,000 rpm for 30 seconds, irradiated with UV under the irradiation condition of 3,000 mJ/cm$^2$ for 10 minutes by using an ultrahigh pressure mercury lamp (product name: UL-7000, manufacturer: Quintel) to photo-cure to form the removal film A 31 and removal film B 32, to thereby prepare the polymer optical waveguide 10b.

The thickness of the removal film A 31 and removal film B 32 was measured in the same procedures as in Example 1. As a result, the thickness was 100 m.

The visible light transmittance of the removal film A 31 and removal film B 32 in a wavelength of from 380 nm to 780 nm at a thickness of 100 μm was measured in the same procedures as in Example 1. As a result, the visible light transmittance was 80.2%.

Before peeling, the films were further subjected to a treatment so as to be a peelable state by irradiating with UV under the irradiation condition of 3,000 mJ/cm$^2$ for 10 minutes by using an ultrahigh pressure mercury lamp (product name: UL-7000, manufacturer: Quintel) and then dipping in 80° C. hot water.

The peeling force of the removal film A 31 and removal film B 32 was measured in the same procedures as in Example 1. As a result, the peeling force was 0.95 N/25 mm.

The adhesion of the removal film A 31 and removal film B 32 was evaluated in the same procedures as in Example 1. The evaluation result was A.

The amount of foreign substances on the core-coupling section 21 was evaluated in the same procedures as in Example 1. The evaluation result was B.

The amount of foreign substances on the ferrule-coupling section 22 was evaluated in the same procedures as in Example 1. The evaluation result was B.

The removal film of Example 12 has a high adhesive force as compared with the removal film of Example 5, but is difficult to peel. As a result, the polymer optical waveguide after peeling had a curled shape.

(Insertion Loss)

After peeling the removal film, insertion loss of the polymer optical waveguides of Examples 1 to 8 was measured in the following procedures.

Insertion loss was measured by the method described in JPCA Standards 4.6.2.1 Cutback method (2008). As for the combination of optical fiber at the incident side and the mode of the optical waveguide, a single mode fiber was used at the incident side and another single mode fiber was used at the outgoing side in the combination corresponding to the combination No. 6 described in JPCA Standards Table 4.6.1-1. As for the fiber used for the insertion loss measurement, a single mode fiber (manufactured by Corning, Part number: SMF 128, NA 0.11, core diameter 10 μm) was used at both the incident side and outgoing side. A unit (Model: AQ2140, manufacturer: Ando Electric Co., Ltd.) having an LD light source (Model: AQ4213, manufacturer: Ando Electric Co., Ltd.) was used as the light source at the light emission side used in the optical measurement system. A power meter (Model: Q8221 unit, manufacturer: Advantest Corporation) and a sensor unit (Model: Q82208, manufacturer: Advantest Corporation) were used at the light receiving side.

It was confirmed in Examples 1 to 8 that the insertion loss of the polymer optical waveguide 10b is 2.0 dB or less.

Although the present invention has been described in detail and by reference to the specific embodiments, it is apparent to one skilled in the art that various modifications or changes can be made without departing the spirit and scope of the present invention.

This application is based on Japanese Patent Application No. 2017-157129 filed on Aug. 16, 2017, the disclosure of which is incorporated herein by reference.

REFERENCE SIGNS LIST 10a, 10b, 10c, 10d, 10e: Polymer optical waveguide
20: Polymer optical waveguide body
21: Core-coupling section
22: Ferrule-coupling section
30, 31: Removal film A
32: Removal film B
33, 34: Removal film C
40, 41: Peel tab
40a, 41a: Peel tab (body)
40b, 41b: Peel tab (seat part)
42, 43, 44: Peel tab
50, 51: Protective member
60, 61: Cleaved groove
100: Silicon photonics interface
200: Silicon optical waveguide
210: Core
220: Cladding
230: Concave part
300: Polymer optical waveguide
310: Core
320: Cladding
330: Convex part
340, 350: Ridge
400: Ferrule
410: Lower member
420: Upper member
430: Concave part
440, 440a, 440b: Ridge
450: Opening
1000: Pinching means
2000: Finger

The invention claimed is:

1. A polymer optical waveguide comprising: a core; and a cladding having a refractive index lower than that of the core, provided around the core,
wherein the polymer optical waveguide comprises:
a core-coupling section where at least a part of the cladding is not present along a light propagation direction of the polymer optical waveguide; and
an application type removal film A provided so as to come into contact with the core of the core-coupling section, wherein the removal film A comprises a peel tab.

2. The polymer optical waveguide according to claim 1, further comprising:
a ferrule-coupling section; and
an application type removal film B present in the ferrule-coupling section.

3. The polymer optical waveguide according to claim 1, wherein the removal film A has a thickness of from 1 μm to 500 μm.

4. The polymer optical waveguide according to claim 3, wherein the removal film A has a visible light transmittance of 30% or more in a wavelength of from 380 nm to 780 nm at a thickness of 100 μm.

5. The polymer optical waveguide according to claim 1, wherein a peeling force between the removal film A and the polymer optical waveguide is from 0.1 N/25 mm to 2.5 N/25 mm.

6. The polymer optical waveguide according to claim 1, wherein a hardness of the peel tab is higher than a hardness of the removal film A.

7. The polymer optical waveguide according to claim 1, further comprising a protective member between the peel tab and the polymer optical waveguide.

8. The polymer optical waveguide according to claim 7, wherein a peeling force between the protective member and the polymer optical waveguide is lower than a peeling force between the removal film A and the polymer optical waveguide.

9. The polymer optical waveguide according to claim 7, wherein the protective member is formed of a material having an adhesive strength to the polymer optical waveguide, wherein the adhesive strength is decreased by UV irradiation.

10. The polymer optical waveguide according to claim 2, further comprising a removal film C that includes the removal film A and the removal film B, wherein the removal film C has a cleaved groove between the removal film A and the removal film B.

11. The polymer optical waveguide according to claim 10, having a portion at which a protective member and a peel tab are arranged in this order between the polymer optical waveguide and the removal film C, wherein the cleaved groove penetrates through the removal film C and the peel tab and reaches the protective member.

12. The polymer optical waveguide according to claim 11, wherein the cleaved groove in the protective member has a depth of from 10% to 50% of a thickness of the protective member.

13. The polymer optical waveguide according to claim 1, wherein the removal film A is formed of a resin composition free of a silicone compound.

14. The polymer optical waveguide according to claim 13, wherein the removal film A is formed of a resin composition comprising a compound undergoing ring-opening polymerization and/or its polymer.

15. The polymer optical waveguide according to claim 14, wherein the removal film A is formed of a resin composition comprising a cyclic acetal and/or its polymer.

16. The polymer optical waveguide according to claim 15, wherein the removal film A is formed of a resin composition comprising 1,3-dioxolane and/or its polymer.

* * * * *